United States Patent [19]

Matsushita et al.

[11] Patent Number: 4,709,558
[45] Date of Patent: Dec. 1, 1987

[54] ADSORPTION REFRIGERATING APPARATUS

[75] Inventors: Masao Matsushita, Osaka; Kenzo Oku, Kyoto; Hiroki Nakano, Hirakata; Shin-ichi Okumura, Ootsu, all of Japan

[73] Assignee: Nishiyodo Air Conditioner Co., Ltd., Osaka, Japan

[21] Appl. No.: 907,201

[22] Filed: Sep. 12, 1986

[30] Foreign Application Priority Data

Jan. 28, 1986 [JP] Japan ................................. 61-017326

[51] Int. Cl.$^4$ ............................................. F25B 17/08
[52] U.S. Cl. ....................................................... 62/480
[58] Field of Search ................................. 62/106, 480

[56] References Cited

U.S. PATENT DOCUMENTS

| | | | |
|---|---|---|---|
| 2,088,276 | 7/1937 | Nesselmann et al. | 62/480 X |
| 2,167,264 | 7/1939 | Dunz | 62/480 |
| 4,368,623 | 1/1983 | Knoche et al. | 62/106 X |
| 4,610,148 | 9/1986 | Shelton | 62/106 X |
| 4,637,218 | 1/1987 | Tchernev | 62/106 |

Primary Examiner—Lloyd L. King
Attorney, Agent, or Firm—Flynn, Thiel, Boutell & Tanis

[57] ABSTRACT

An adsorption refrigerator includes a vacuum vessel within which a required amount of refrigerant is hermetically filled, and there are housed a first finned tube for routing therethrough a heating medium on the heat source side, which tube has an adsorbent packed and held in fin interstices, and a second finned tube for routing therethrough a heating medium on the utilization side, which tube serves as a vaporizer and condenser. The refrigerator further may be provided, at the bottom portion of the vessel, with refrigerant heating means for heating and vaporizing the refrigerant during desorption. Otherwise, where the amount of refrigerant is adjusted, the refrigerator may be provided with refrigerant heating and cooling means for heating to vaporize the refrigerant during desorption and for cooling to condense refrigerant vapors, at the bottom portion of the vessel, and with a refrigerant reservoir for reception of the adjusted amount of refrigerant, which reservoir is connected through a line and valve to the bottom of the vessel, below the bottom of the vessel. The first finned tube preferably has a fin pitch of 1 to 10 mm and a fin height of 5 to 20 mm. With the refrigerator, even low-temperature fluid of less than 80° C. may be utilized for the heat source-side heating medium.

24 Claims, 11 Drawing Figures

Fig. 4(a) Desorption Stage

Fig. 4(b) Adsorption Stage

Fig. 4(c) Refrigerant Recovery Stage

ADSORPTION REFRIGERATING APPARATUS

BACKGROUND OF THE INVENTION

1. Field of the Invention

This invention relates to an adsorption refrigerating apparatus on which refrigerating operation is performed by taking advantage of adsorption and desorption actions of a refrigerant to and from an adsorbent.

2. Statement of Related Art

Worldwide trend toward shortage or depletion of energy resorces is a serious problem particularly for those countries poor in energy resources. Against wasteful use of energy resources, therefore, stringent control is required henceforth.

There exist various kinds of energy resources, but in the status quo, low-temperature heat sources of less than 80° C., for example, cooling water after recovery of high-temperature heat in thermal power plants or heat generated subsidiarily in chemical plants, etc. are discarded without being harnessed effectively because there are problems in efficiency of a recovery apparatus for them and recovery cost.

Further, in the field of utilization technology for solar heat energy which is being developed aiming at aquiring clean energy, it is well known that to utilize a low-temperature heating medium of less than 80° C. which is easily made available by means of a flat-plate heat collector, as a heat source for air-conditioning operation is most advantageous in terms of apparatus cost and running expenditure. In this case, however, if the air-conditioning system is constructed of a conventional absorption refrigerator, because of too low temperature of the heat source, it cannot extend sufficiently capability fulfilling temperature conditions of a general air-conditioning system, i.e. inlet temperature of cooling water: 30° C., cooling inlet temperature: 12° C., and outlet temperature of cooled water: 7° C., and a big-sized construction of the refrigerator and accordingly, steep rise in apparatus cost were unavoidable.

For these reasons, an attempt to incorporate an adsorption refrigerator availing itself of adsorption and desorption actions of a refrigerant to and from an adsorbent such as silica gel, zeolite into air-conditioning system instead of the conventional absorption refrigerator is currently under review.

Figure 8:
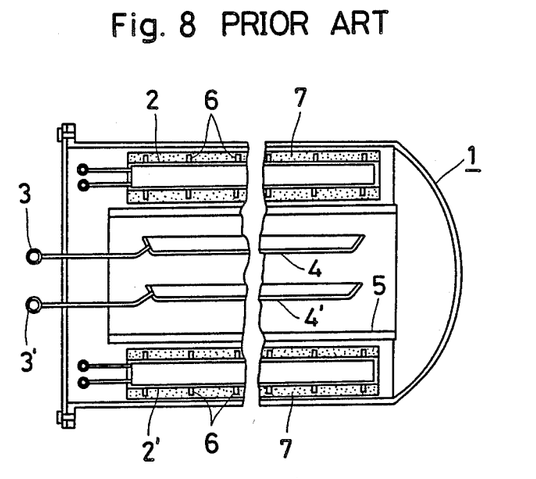
FIG. 8 is an elevational sectional view of a prior art adsorption refrigerator.

A known example of an adsorption refrigerator of this type is depicted in FIG. 8. This adsorption refrigerator is constructed of a sideways-elongated cylindrical vacuum vessel (1) sealed therein with a given amount of a refrigerant, internally of which there are horizontally disposed at definite intervals finned heat transfer tubes (2)(2') for routing therethrough a heating medium available from a solar-energy collector, etc. and dish-form vaporizer-condensers (4)(4') rendered integral with linear manifolds (3)(3') for passage of a utilization-side heating medium; a cylindrical shield having an exhalation resistance is installed to encircle the vaporizer-condensers (4)(4'); and a solid adsorbent (7) such as zeolite, activated charcoal, activated alumina or silica gel is filled in the interstices between opposed fins (6) on the outer periphery of the heat transfer tubes (2)(2').

With this apparatus, at desorption run stage when a fluid supplied from a heat source is routed through the heat transfer tubes (2)(2') to heat the solid adsorbent (7) and cause desorption, the refrigerant vapors exhaled from the adsorbent (7) are condensed to deposit on the surfaces of the vaporizer-condensers (4)(4'). On the other hand, at adsorption run stage when a cooling water is flowed through the heat transfer tubes (2)(2') to cool the solid adsorbent (7), the adsorbent (7) adsorbs the refrigerant vapors within the vacuum vessel (1) and the refrigerant liquid on the surfaces of the vaporizer-condensers (4)(4') in vapor state. When the refrigerant on the surfaces of vaporizer-condensers (4)(4') is vaporized and to be adsorbed, it deprives the vaporization latent heat of them and cools the utilization-side heat transfer medium which routes through the manifolds (3) integrated with the vaporizer-condensers (4)(4'). In this manner, the adsorption and desorption are alternately repeated to cool the utilization-side heat transfer medium which is used for air conditioning of buildings, etc. This type of adsorption refrigerator is, for example, disclosed in Japanese Patent Publication JP 60-36852 (1985) A1.

Generally, in an adsorption refrigerator wherein an adsorbent is used, the shorter the time required for adsorption and desorption of an adsorbent (7) is, the more the refrigerating capability per unit time is increased, and refrigerating capability upon continuous operation is also enhanced vastly. The amount of refrigerant within the vessel (1) (namely, saturated adsorption amount of the adsorbent) is, as referred to above, determined on the basis of the temperature conditions of air-conditioning system when the apparatus is run, i.e. refrigerating capability and setting temperatures, and at the same time, required amount of the adsorbent is also indispensably determined. As a consequence, provided that the amount of adsorbent is determinate, time of the adsorption-desorption cycle, particularly speed of adsorption stage depends largely on the configuration of the heat transfer tube (2) on which the adsorbent is packed and held.

On the vaporizer-condenser side, the ability of retaining condensation of the refrigerant, particularly that of retaining the refrigerant in a homogeneous and thinnest possible liquid film state can speed up the adsorption of the adsorbent (7).

In addition to the adsorption-desorption speed of adsorbent and a refrigerant-retaining ability on the vaporizer-condenser side as described above, excess or deficiency of the refrigerant amount within the vessel further affects largely on the refrigerating capability of an adsorption refrigerator and hence it is crucial to regulate the refrigerant amount.

Figure 9:
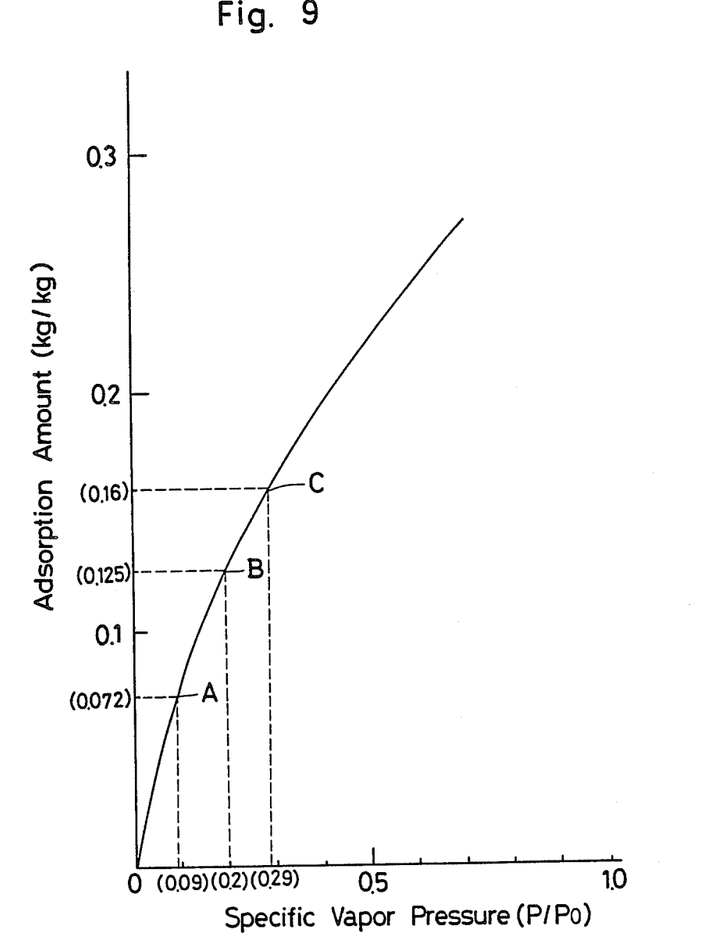
FIG. 9 is a graph showing a relationship between specific vapor pressure and adsorption amount by an adsorbent.

What is responsible for the excess and deficiency of the refrigerant amount is considered as follows:

An operation example with an adsorption refrigerator will be explained on the basis of a diagram illustrated in FIG. 9 showing properties of an adsorbent.

At the time when desorption is terminated, assuming that the conditions are:
adsorbent temperature: 80° C.,
condensation temperature: 30° C.,
adsorbent: silica gel,
refrigerant: water,
the specific vapor pressure ($P/P_o$) is 0.09 as calculated:

$$P/P_o = \frac{\text{(saturated vapor pressure of the refrigerant at the condensation temp.)}}{\text{(saturated vapor pressure of the refrigerant at the adsorbent temp.)}}$$

$$= 31.8 \text{ mmHg}/355.3 \text{ mmHg}$$

= 0.09.

At this value, the adsorption amount is 0.072 kg/kg as intrapolated from the graph in FIG. 9 (point A). At the time when adsorption is terminated, assuming that the adsorbent temperature is 30° C. and vaporization temperature 5° C., the specific vapor pressure is 0.2 as calculated:

$P/P_o = 6.54 \text{ mmHg}/31.8 \text{ mmHg} = 0.2$.

Here, the adsorption amount of silica gel to the refrigerant is 0.125 kg/kg as intrapolated from the graph (B point).
Therefore, the amount of refrigerant partaking of refrigeration work (circulation amount of refrigerant) is 0.053 kg/kg ($=0.125-0.072$).

On the other hand, even if the specific vapor pressure at the time of termination of desorption is the value at point A, assuming that the adsorbent temperature is 30° C. and the vaporization temperature 10° C. when adsorption is terminated, the specific vapor pressure is 0.29 ($P/P_o = 9.26 \text{ mmHg}/31.8 \text{ mmHg} = 0.29$). Here, the adsorption amount is 0.16 kg/kg (as intrapolated from the graph, point C) and the refrigerant circulation amount is increased to 0.088 kg/kg ($=0.16-0.072$).

It follows from this that even if the specific vapor pressure when desorption is finalized is the same, rise in the vaporization temperature at the time of termination of adsorption or drop in the adsorbent temperature increases the circulation amount of the refrigerant and accordingly, should enhance refrigeration capability.

However, when the filling amount of refrigerant is predetermined so that the refrigerant may circulate between point A and point B, even if it is tried to operate between point A and point C by altering the setting temperatures, the deficiency in the refrigerant amount will deteriorate refrigerating capability. Conversely, when the filling amount of the refrigerant is predetermined so that the refrigerant may circulate between point A and point C, if the running conditions are altered to those between point A and point B, the refrigerant amount becomes excessive and the surplus refrigerant is deposited on the inner face of the vaccum vessel (1). And the refrigerant, when vaporized, is consumed as an energy for cooling the vacuum vessel (1), thus being fraught with energy loss.

However, the prior art adsorption refrigerator as mentioned above is generally aimed at utilization of relatively high-temperature heat source of 100°-300° C., and can be constructed so that the adsorbent temperature at the time of desorption being terminated may be high and the refrigerant adsorption amount may be large, whereby refrigerating capability as required can be ensured. Accordingly, for the heat transfer tube (2), its fin shape, fin height, etc. are not particularly devised, but a usual finned heat transfer tube which holds a solid adsorbent on the outer periphery thereof is merely used.

If the known apparatus is run by harnessing a low-temperature heat source of less than 80° C., the refrigerant adsorption amount will reduce to a great degree and refrigerating capability per unit time will diminish markedly. Thus, the temperature conditions of air-conditioning system cannot be satisfied.

In order to overcome these problems, it is not impossible to increase packing amount of the adsorbent and number of the heat transfer tube for holding the adsorbent, but this will entail problems of providing a large-sized refrigerator apparatus and high rise in product price.

Another problem with the vaporizer-condensers (4)(4') in a tray form is that they have a small refrigerant-holding area and cannot control the thickness of refrigerant liquid film formed thereon. Hence, by the use of the tray-form vaporizer-condensers, refrigerating capability could not be extended sufficiently.

Further problems with such tray-form vaporizer-condensers is that at desorption run stage, since a temperature difference exists between the inlet and outlet for cooling water on the vaporizer-condenser side, condensation amount of the refrigerant, namely thickness of refrigerant liquid film on the surfaces of the vaporizer-condensers is not uniform over the entire surfaces. In a larger thickness portion of the liquid film than a predetermined thickness, vaporization speed is late and adsorption-desorption cycle time is prolonged, and the refrigerant liquid portion which no longer can sustain itself drops down onto the bottom of vessel and is deposited on its surface. The deposited refrigerant, upon adsorption running, is vaporized to cool the vessel, thus being consumed as a vain energy, and cannot be output as a refrigerating capability, which runs into reduction of efficiency of the refrigerating apparatus as a whole.

Again, in the known adsorption refrigerator, since the refrigerant which is hermetically filled in the vacuum vessel (1) and participates in adsorption and desorption is always contained in a constant amount, there occurs change in the temperature conditions identical to load variation of the adsorption refrigerator. For instance, when an intended setting temperature is adjusted to drop in response to increase in the load on the utilization-side, the refrigerant amount is too deficient to exhibit the refrigerating capability sufficiently and conversely, when decrease in the load on the utilization-side renders the refrigerant amount excessive, the refrigerant liquid film formed on the surfaces of vaporizer-condenser trays is not only thickened more than the value predetermined, which runs into reduction of heat transfer coefficient, but also drips down on the bottom of the vacuum vessel (1) and the refrigerant liquid dropped causes energy loss upon adsorption, cooling the vessel itself.

SUMMARY OF THE INVENTION

This invention has been accomplished to cope with the problems prior art adsorption refrigerators have posed, viz. reduction in refrigerating capability due to excess and deficiency of refrigerant amount and a large-sized construction of apparatus.

A primary object of this invention is to provide an adsorption refrigerator with which adsorption and desorption cycle is expedited and on the vaporizer-condenser side, refrigerant retaining ability is enhanced and refrigerant liquid film is controlled in a uniform, optimum thickness, thereby to enhance refrigerating capability.

Another object of this invention is to provide an adsorption refrigerator wherein refrigerant heating means is installed at a bottom portion of a refrigerator vessel in order to restore the refrigerant flowed down on the bottom of the vessel to vapors, thereby to homogeneously hold the whole refrigerant liquid film on the vaporizer-condenser side, minimize the energy loss expended in cooling of the vessel, and elevate the system efficiency.

A further object of this invention is to provide an adsorption refrigerator with refrigerant heating-and-cooling means at a bottom portion of a vessel thereof and a refrigerant reservoir tank for recovering surplus refrigerant or compensating for deficiency of refrigerant which tank is connected through a line equipped with a vacuum valve to the bottom of vessel, thereby to adjust the refrigerant amount to such an amount compatible with predetermined temperature conditions and elevate the system efficiency.

A still further object is to specify the fin pitch and fin height of a finned tube holding thereon granular solid adsorbent to such magnitudes that heat transfer between fins and the solid adsorbent is good and the refrigerant vapors readily pass through the packing voids of the solid adsorbent, thereby to shorten the time of adsorption-desorption cycle.

In order to achieve the foregoing objects, according to one aspect of this invention, there is provided an adsorption refrigerating apparatus comprising a vacuum vessel hermetically filled with a required amount of a refrigerant within it, a first finned tube for routing therethrough a heat transfer medium on the heat source side and a second finned tube for routing therethrough a heat transfer medium on the utilization side, the first and second finned tubes being housed within the vessel, the first finned tube being packed and held with an adsorbent in the interstices between fins.

According to another aspect of this invention, there is provided an adsorption refrigerating apparatus comprising a vacuum vessel hermetically filled with a required amount of a refrigerant within it, a first finned tube for routing therethrough a heat transfer medium on the heat source side and a second finned tube for routing therethrough a heat transfer medium on the utilization side which both are accommodated within the vessel, the first finned tube being packed and held with an adsorbent in the fin interstices, and refrigerant heating means for heating the refrigerant at adsorbent desorption stage to vaporize it, which means is located at the bottom portion of the vessel.

According to a further aspect of this invention, an adsorption refrigerating apparatus is provided which comprises a vacuum vessel filled hermetically with a required amount of a refrigerant internally thereof, a first finned tube for routing therethrough a heat transfer medium on the heat source side and a second finned tube for routing therethrough a heat transfer medium on the utilization side, which both are housed in the vessel, the first finned tube being packed and held with an adsorbent in the interstices between fins, refrigerant heating and cooling means for heating and vaporizing the refrigerant at desorption stage from the adsorbent and for cooling and condensing refrigerant vapors at refrigerant recovery stage, which means is located at the bottom portion of the vessel, and a refrigerant reservoir tank for adjusting the refrigerant amount located below the bottom of the vessel and connected through a line equipped with a vacuum valve to the bottom of vessel.

BRIEF DESCRIPTION OF THE DRAWINGS

FIG. 4 is a circuit diagram of an air conditioning system to which the foregoing adsorption refrigerating apparatus is applied, wherein

DETAILED DESCRIPTION OF THE PREFERRED EMBODIMENTS

The invention will be described in more detail with reference to FIGS. 1 to 3.

A vacuum vessel 11 within which a required amount of a refrigerant is filled hermetically houses internally thereof a first finned tube 12 for routing therethrough a heat transfer medium from a low-temperature heat source, for example, a heat transfer medium of less than 80° C. and a second finned tube 14 for routing therethrough a utilization-side heat transfer medium, the first finned tube 12 holding and packing a granular solid adsorbent 19 such as granular silica gel in fin interstices 18 between fins.

The first finned tube 12 is constructed so that it has a fin pitch (P) of 1 to 10 mm and a fin height (H) of 5 to 20 mm, and in the fin interstices 18, voids 21 are formed among the adsorbent granules in a continuous manner through the depth of the adsorbent bed so as to allow the refrigerant vapors within the vessel 11 to pass freely and to ensure a good contact between the adsorbent 19 and refrigerant vapors as far as possible.

For the first finned tube 12 and the second finned tube 14, there may be used an aerofin type heat exchanger in which horizontal fins 17, 23 are attached to the outer peripheries of vertical heat transfer tubes 16, 22, or a cross-fin type heat exchanger in which a plurality of heat transfer tubes 16, 22 are linked by rectangular fins 17, 23.

Particularly, with the second finned tube 14, since it is required to condense overall an amount of the refrigerant within the vessel 11 on its surface and to hold the whole refrigerant in a liquid film state, the second finned tube is designed so that its heat transfer area is wide enough, and if necessary, the heat transfer tube is formed with a rugged surface (having numerous projections and depressions) so as to increase its heat transfer area.

In another embodiment, the adsorption refrigerator constructed of the vacuum vessel and the first and second finned tubes is provided with, at the bottom portion of the vessel 11, refrigerant heating and cooling means 26 for heating or cooling the refrigerant and, below the vessel 11, a refrigerant reservoir tank 29 for recovering thereto surplus refrigerant which stagnates at the bottom of the vessel or for replenishing therefrom deficient amounts of refrigerant to the vessel, which tank is connected through a line 28 equipped with a valve 27 to the vessel.

The refrigerant heating means or refrigerant heating and cooling means 26 is usually constructed of a hollow tank and a heat transfer medium on the heat source side or a cooling water which is admitted and supplied to that tank, thereby to heat and/or condense the refrigerant.

The adsorption refrigerating apparatus having the construction described above is operated as follows:

A heat transfer medium on the heat source side is routed through the first finned tube 12 to heat the adsorbent 19 to induce desorption, and concurrently, a cooling water is flowed through the second finned tube 14, on which the refrigerant vapors deposited from the absorbent 19 are condensed and the refrigerant is retained in a liquid film state.

During this stage, on the first finned tube 12 side, good heat transfer is maintained between the refrigerant and the adsorbent 19 packed and held in the fin interstices 18 owing to the fact that the fin pitch (P) and fin height (H) are set to be 1 to 10 mm and 5 to 20 mm, respectively, and hence, the time required for desorption is curtailed.

At the adsorption operation stage, a utilization-side heat transfer medium is routed through the second finned tube 14 while a cooling water is flowed through the first finned tube 12 to cool the adsorbent 19, which in turn adsorbs the refrigerant vapors within the vessel 11. Simultaneously, refrigerant liquid on the surface of the second finned tube 14 is vaporized to deprive vaporization latent heat of the second finned tube 14 and the heating medium on the utilization side is cooled. At this time, on the first finned tube 12 side, heat transfer between the adsorbent 19 and the first finned tube 12 is maintained efficiently because of the optimum fin pitch (P) and fin height (H) and cooling action of the adsorbent 19 is enhanced. Further, the presence of the passageway voids 21 in the fin interstices 18 provides a good contact between the refrigerant vapors and adsorbent 19 and a fast adsorption speed.

In this way, the time required for adsorption-desorption cycle is shortened, so that refrigerating capability increases without the necessity of increasing the amount of adsorbent. Hence, continuous run refrigerating capability is ensured, fulfilling the temperature conditions of general air conditioning system and even a low-temperature heat source of for example, less than 80° C. can be effectively utilized for the air conditioning system.

When the refrigerant amount within the vessel 11 gets excessive, due to an alteration of setting temperatures of the present adsorption refrigerating apparatus, while a heating medium on the heat source side is routed through the first finned tube 12 to cause desorption of the refrigerant from the adsorbent 19, the refrigerant is cooled by means of the refrigerant heater-condenser 26 and condensed on the bottom of the vessel 11. Thereafter when the valve 27 is opened, the whole amount of the refrigerant within the vessel is recovered automatically by gravity action through the line 28 to the refrigerant reservoir tank 29. In that state, again in filling a required amount of the refrigerant into the vessel 11, during an adsorption run stage when a cooling water is flowed through the first finned tube 12 to cool the adsorbent 19 and a utilization-side heat transfer medium is routed through the second finned tube 14, the valve 27 is opened, and the refrigerant within the refrigerant reservoir tank 29 is admitted into the vessel 11 in a vapor form. And the adsorbent 19 adsorbs the refrigerant in a required amount. The same procedure is conducted also in case of compensating for a deficient amount of refrigerant in response to variations of running conditions.

Whether the refrigerant amount within the vessel 11 reaches the amount corresponding to temperature conditions predetermined or not can be readily sensed with the aid of a pressure sensor fitted to the vessel 11 by gauging the saturated vapor pressure at a definite condensation temperature in terms of variations in pressure within the vessel 11. According to the directions of the sensor, the valve 27 can be opened or closed.

Now, embodiments of this invention will be hereinbelow described with reference to the accompanying drawings.

Referring to FIGS. 1, 2 3 and 4(a), (b), (c), the reference numeral 11 designates a vessel constituting a body of the adsorption refrigerator, 12 a first finned tube constructed as a thin cross-fin type heat exchanger housed in the inner space 13 of the vessel 11, 14 a second finned tube serving both as a condenser and vaporizer which second tube is housed and disposed in parallel with the first finned tube 12 at a given interval or spacing in the vessel 11, and 15 a pressure sensor for detecting pressure within the vessel 11. Inside the vessel 11, a required amount of refrigerant such as water is hermetically filled and the inner space 13 of the vessel 11 is maintained in vacuum.

The first finned tube 12 is installed so that a plurality of horizontal fins 17 are vertically attached on the outer periphery of a vertical heat transfer tube 16. In fin interstices 18 on the outer periphery of the heat transfer tube, a granular solid adsorbent 19 such as silica gel is packed and held in position, covered with wire nets 20, 20' thereon.

The first finned tube 12 is designed to have a fin pitch of 1 to 10 mm and a fin height of 5 to 20 mm. The particle diameter of the adsorbent 19 and size of packing voids 21 among the adsorbent granules packed in the fin interstices 18 are chosen so that refrigerant vapors may pass freely through the voids 21 and readily make contact with a portion of the adsorbent 19 located near the surface of the heat transfer tube 16.

Here, by the term "fin height (H)" used throughout the specification is meant a distance from the outer surface of the heat transfer tube 16, viz. the root of the fin 17 to the outlet and inlet of the refrigerant vapors at the outermost extremity of the fin interstice space 18. In case where the fin 17 is of polygonal shape other than circular shape concentric with the heat transfer tube 16, it means an average value of radial distances. Accordingly, for a cross-fin type of heat exchanger, the fin height is defined in terms of a thickness of the whole heat exchanger as well as an orientation distance between the heat transfer tubes 16.

As for the adsorbent, the smaller its particle diameter, the larger the contact area of it with refrigerant vapors per unit quantity and the more, it is possible to heighten adsorption speed. However, when the particle diameter is too small, the packing density is so high that the refrigerant vapors are difficult to pass through the voids 21. It is therefore essential that the particle diameter of adsorbent be chosen taking this into account. P The second finned tube 14 is also constructed as a cross-fin type heat exchanger similar to the first finned tube 12, in which fins 23 are horizontally attached on the outer peripheries of vertical heat transfer tubes 22. With the second finned tube 14, the overall amount of refrigerant condensed on the surface thereof can be held in a uniform and thinnest possible liquid film state. On the surfaces of the heat transfer tubes 22 and fins 23, a rugged face (projections and depressions) 24 and a corrugated face 25 are formed, respectively to increase their heat transfer areas.

The vessel 11 is provided, at its bottom portion, with a tank 26 which serves to heat or cool the bottom face 11a of the vessel by passage of warm water or cooling water through the tank.

At the location below the tank 26, a refrigerant reservoir 29 of a required volume capable of maintaining always vacuum is installed and connected to the tank 26 through a line 28 equipped with a vacuum valve 27 midway.

Figure 4A:
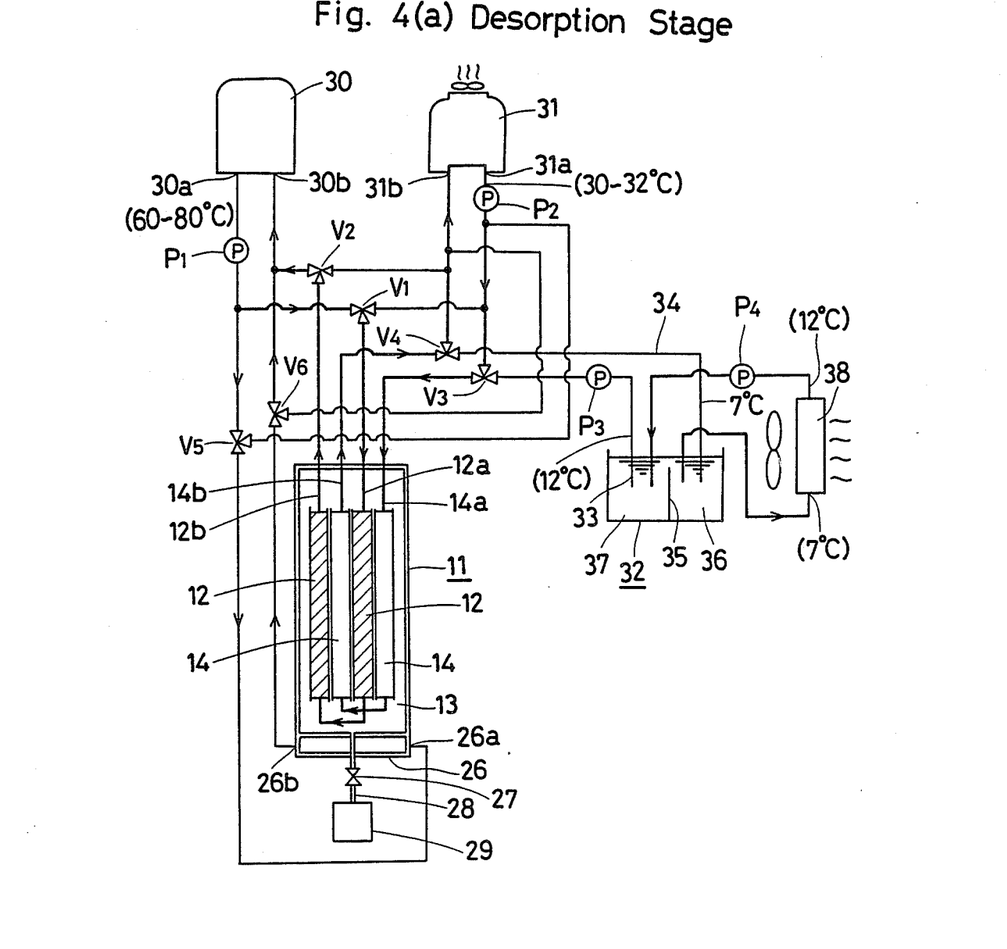
FIG. 4(a) shows a state of desorption run stage, FIG. 4(b) a state of adsorption run stage and FIG. 4(c) a state of refrigerant recovery stage.

The adsorption refrigerator apparatus as constructed above is, for example, applied to an air conditioning system as follows:

An inlet port 12a provided on the first finned tube 12 is connected via a three-way valve $V_1$ to a heating medium outlet 30a of a low-temperature heat source 30 such as a solar-energy collector, boiler or heat exchanger for waste heat recovery and to a cooling water outlet 31a of a cooling water feed source 31 such as from a cooling tower through pumps, respectively, $P_1$ and $P_2$. And, an outlet port 12b of the apparatus is connected through a three-way valve $V_2$ to a heating medium inlet 30b of the low-temperature heat source 30 and to a cooling water inlet 31b of the cooling water feed source 31.

The second finned tube 14 is, at its inlet port 14a, connected through a three-way valve $V_3$ to discharge outlets of a pump $P_3$ for pumping up a utilization-side heat transfer medium through a piping 33 from a thermal accumulating tank 32 and of the pump $P_2$, whereas it is, at its outlet port 14b, connected through a three-way valve $V_4$ to a piping 34 through which to feed a utilization side heat transfer medium to the thermal accumulating tank 32 and to the cooling water inlet 31b of the cooling water feed source 31.

The thermal accumulating tank 32 is separated into a low-temperature compartment 36 and a high-temperature compartment 37 by a partition wall 35 above which a fluid is capable of passing. The utilization-side heat transfer medium which is pumped up from the low-temperature compartment 36 by means of a pump $P_4$ is fed always to a heat exchanger 38 for air conditioning, from where the heat transfer medium having a temperature elevated is refluxed to the high-temperature compartment 37. Thus, the heat accumulating tank 32 serves to absorb any difference in circulating amount of the pumps $P_3$ and $P_4$ and further to accumulate cold heat of the heating medium fed from the adsorption refrigerator, to continuously feed the cold heat to an air conditioning zone in a down time (a time required for desorption).

The tank 26 provided at the bottom of the vessel 11 is connected, at its inlet 26a, through a three-way valve $V_5$ to the discharge sides of the pumps $P_1$ and $P_2$ and, at its outlet 26b, through a three-way valve $V_6$ to the heat transfer medium inlet 30b of the low-temperature heat source 30 and the cooling water inlet 31b of the cooling water feed source 31.

The actuation and operation of the adsorption refrigerating apparatus thus constructed which is applied to an air conditioning system will be described in order.

(A) At desorption operation stage as shown in FIG. 4(a), the pump $P_1$ is driven to feed a heat transfer medium of less than 80° C. (in practice, 60°–80° C.) from the heat transfer medium outlet 30a of the low-temperature heat source 30 through the three-way valve $V_1$ to the inlet port 12a of the first finned tube 12 thereby to heat the adsorbent 19. Concurrently, the pump $P_2$ is actuated to feed a cooling water (30°–32° C.) from the cooling water feed source 31 through the three-way valve $V_3$ to the second finned tube 14 thereby to cool the tube 14. The refrigerant vapors which are desorbed from the adsorbent 19 and discharged into the inner space 13 of the vessel 11 are condensed on the surface of the second finned tube 14 to form a uniform liquid film on the surfaces of the fins 23 and heat transfer tubes 22.

During this process, on the first finned tube 12 side, heat transfer between the adsorbent 19 and the first finned tube 12 is efficiently conducted, and heating and desorption action of the adsorbent 19 is expedited because the fin dimensions (P, H) are optimized as specified above and the adsorbent 19 is packed and held in such narrow fin interstice 18 encompassed by the heat transfer tube 16 and fins 17 so that the amount of the adsorbent to the heat transfer area is optimal.

On the second finned tube 14 side, initially refrigerant vapors begin to condense on the surfaces of the fins 23 and heat transfer tubes 22. A refrigerant liquid film is gradually formed on the surface of the fins 23, whose heat transfer rate somewhat drops, while the refrigerant liquid condensed on the surface of the vertical heat transfer tubes 22 drops down by gravity and is retained on the fins 23, so that the liquid film on the surface of the heat transfer tubes 22 is always maintained in an extremely thin state. As a consequence, condensation can be finalized quickly within the operating temperatures, without heat transfer rate upon condensation being reduced extremely.

During this process, the vacuum valve 27 is in a closed state and the refrigerant amount within the vessel 11 is adjusted to the minimum of necessity within operating temperature range under predetermined running conditions, being constant. Accordingly, substantially whole amounts of the refrigerant is condensed on the surface of the second finned tube 14. However, a portion of the refrigerant liquid locally condensed excessively drops down as droplets on the bottom 11a of the vessel 11. To the tank 26 beneath the bottom 11a, a heating medium (60°–80° C.) is supplied through the three-way valve $V_5$ from the low-temperature heat source 30 disposed in parallel with the first finned tube 12, and the refrigerant liquid dropped on the bottom 11a is therefore heated and restored to its vapors, concurrently with which condensation action occurs mainly in the place where liquid film thickness is insufficient. The refrigerant is thus condensed in a uniform-thickness liquid film state over the whole second finned tube 14.

Figure 4B:
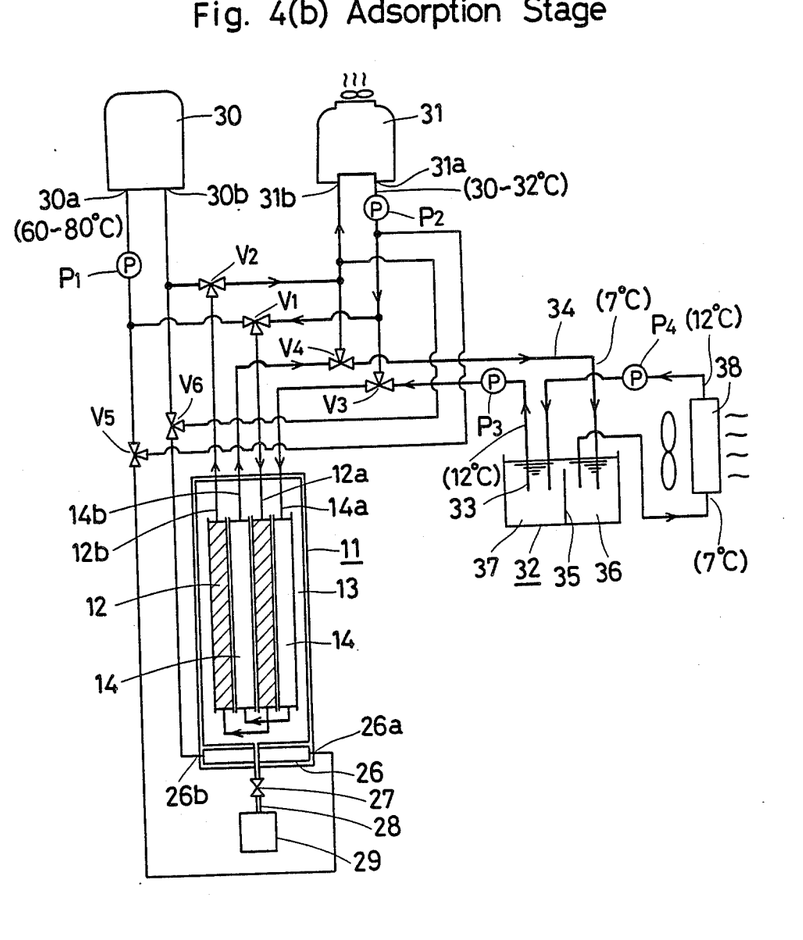

(B) Adsorption operation stage as shown in FIG. 4(b) will be explained.

The pump $P_2$ is driven to feed a cooling water (30°–32° C.) from the cooling water feed source 31 through the three-way valve $V_1$ to the first finned tube 12 and the adsorbent 19 is cooled to adsorb thereon the refrigerant vapors within the vessel 11. Simultaneously, the refrigerant deposited on the surface of the second finned tube 14 is vaporized to deprive vaporization heat of the finned tube 14 thereby to cool the heat transfer medium on the utilization side from 12° C. down to 7° C. which medium is pumped up from the high-temperature compartment 37 of the heat accumulator tank 32 through the piping 33 by means of the pump $P_3$ and fed through the three-way valve $V_3$ to the second finned tube 14 and then to feed that medium (7° C.) through the three-way valve $V_4$ and line 34 to the low-temperature compartment 36 of the heat accumulator tank 32. The utilization-side heat transfer medium on the order of 7° C. is fed by the actuation of the pump $P_4$ from the heat accumulator 32 into a heat exchanger 38 for air conditioning, where it deprives sensible heat of air to elevate the temperature of the heat transfer medium to 12° C., and the heat transfer medium at the elevated temperature is refluxed to the high-temperature compartment 37. In this way, thermal cycle is performed to cool the intended air conditioning area.

In the first finned tube 12, heat transfer coefficient between the adsorbent 19 and the first finned tube 12 is maintained to be high because of the fin pitch (P) and fin height (H) as specified, and cooling action of the adsorbent 19 is expedited and the refrigerant vapors and the adsorbent 19 come in good contact with each other because of the presence of the passageway voids 21 extending from the inlet-outlet of refrigerant vapors to the outer face of the heat transfer tube 16 in the fin interstices 18, whereby adsorption speed is heighten.

In the second finned tube 14, since the refrigerant is held on the surfaces of the fins 23 in a thin liquid film state, vaporization efficiently proceeds, which can shorten the adsorption time, accompanied by speed-up of adsorption to the adsorbent 19.

Figure 4C:
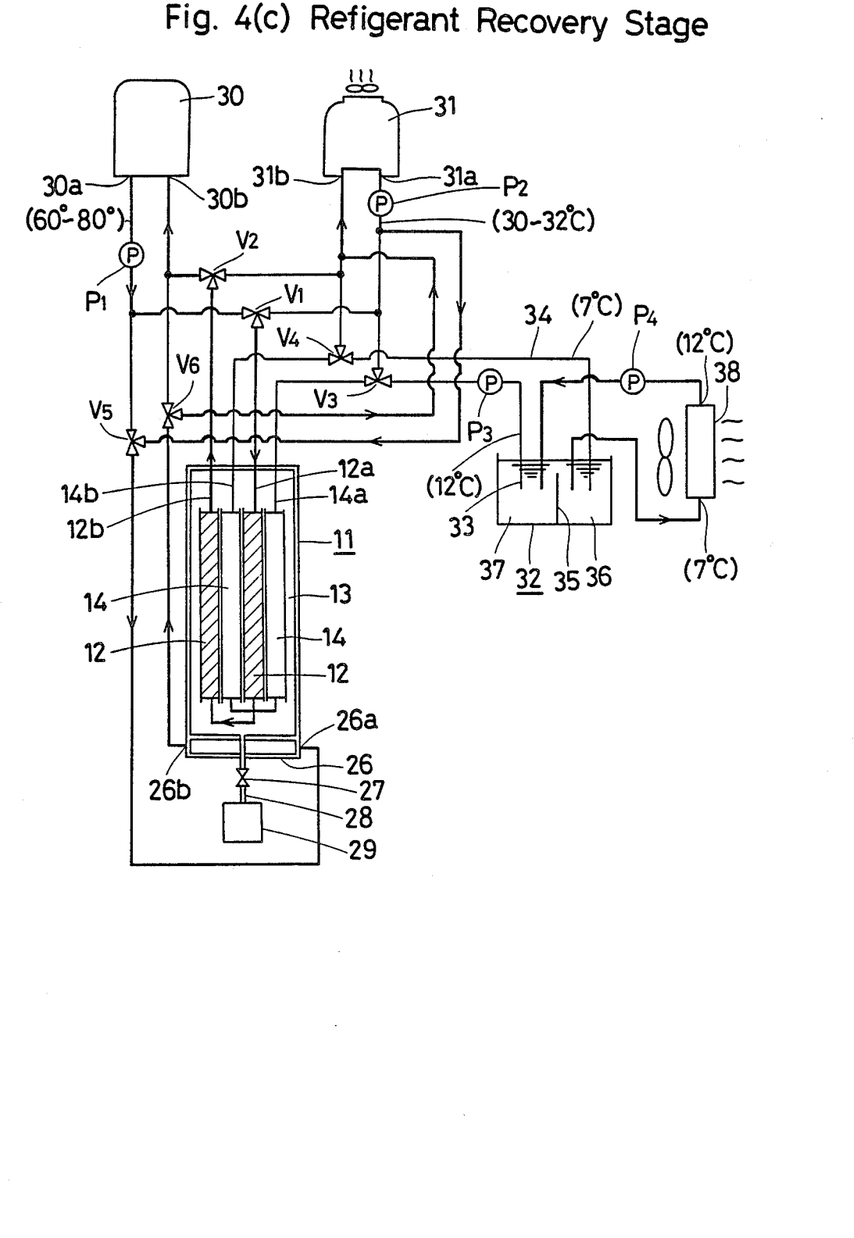

(C) In the case where the refrigerant amount within the vessel 11 is excessive, the amount of the refrigerant is adjusted by a procedure that will be explained with reference to FIG. 4(c).

The pump $P_1$ is driven to flow the heat transfer medium on the heat source side from the low-temperature heat source 30 via the three-way valve $V_1$ to the first finned tube 12 and the adsorbent 19 is heated to cause desorption, while with the aid of the pump $P_2$, a cooling water (30°–32° C.) is fed from the cooling water feed source 31 via the three-way valve $V_5$ to the tank 26. At that time, the three-way valves $V_3$, $V_4$ stand closed and feed of the cooling water to the second finned tube 14 is shut off. Most of the refrigerant vapors desorbed from the adsorbent 19 is accordingly condensed on the bottom 11a of the vessel 11 by the cooling action of the tank 26. Then, when the vacuum valve 27 is opened, the refrigerant liquid collected on the bottom 11a is recovered automatically to the tank 29 owing to gravity.

During this process, the whole amount of the refrigerant is recovered, which is confirmed by sensing that the amount of the refrigerant within the tank 29 reaches a definite recovery amount by means of a float switch.

Thereafter, the adsorption operation as shown in FIG. 4(b) is changed-over. With the vacuum valve 27 opened, the three-way valves are changed over as shown. When the cooling water is fed to the first finned tube 12 and the utilization-side heat transfer medium is passed through the second finned tube 14, the adsorbent 19 adsorbs the refrigerant vapors admitted from the refrigerant reservoir tank 29 via the line 28 to the vessel 11. After a few minutes, when the pressure sensor 15 senses that the saturated vapor pressure at a definite vaporization temperature is reached by detecting rise in the pressure within the vessel 11, the vacuum valve 27 is closed. Thus it is possible to adjust the refrigerant amount within the vessel to a least necessary amount at setting temperatures.

Otherwise, when only surplus refrigerant will be recovered, pressure within the vessel 11 varying with the recovery is detected by means of the pressure sensor 15 thereby to sense that the saturated vapor pressure at a definite condensation temperature is reached. After the recovery of the surplus refrigerant, the vacuum valve 27 is closed.

Conversely, in case where the refrigerant amount within the vessel 11 comes in shortage by alteration of temperature conditions to be set, the vacuum valve 27 is opened, during adsorption running, to introduce the refrigerant vapors in a required amount into the vessel from the refrigerant reservoir tank 29 while sensing the amount by means of the pressure sensor 15.

In the above-described embodiments, the first finned tube 12 and the second finned tube 14 are housed contiguously in a single vessel 11, but this invention is not limited to this construction of vessel. For instance, it may be possible to install separately a container housing the first finned tube 12 and a container housing the second finned tube 14, both containers being connected through a line having such a passageway cross-section that will not impede the movement of refrigerant vapors.

As the second finned tube 14, there may also be used another heat exchanger wherein a long web of fin is coiled around the outer periphery of a heat transfer tube as well as the exemplified heat exchangers of aerofin type and cross-fin type which have horizontal fins.

In the above embodiments, the heat accumulator 32 is installed between the adsorption refrigerator apparatus and the heat exchanger 38 for air conditioning with a view toward making up for a down time for desorption. When the down time lasts longer, it may be possible to use more than 2 units of the aforesaid adsorption refrigerating apparatuses instead of the accumulator 32 and to carry into effect alternately adsorption operation and desorption operation whereby continuous operation is performed.

Figure 1:
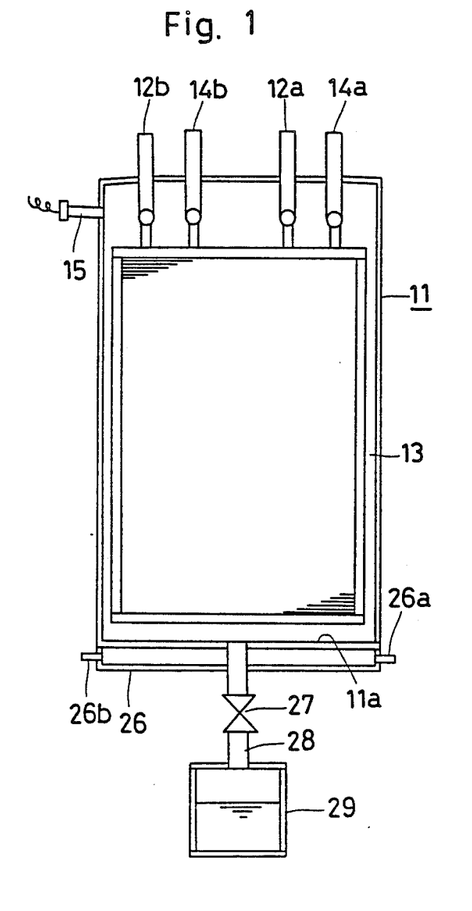
FIG. 1 is a front elevational view in cross-section of one example of an adsorption refrigerating apparatus pertaining to this invention.
Figure 2:
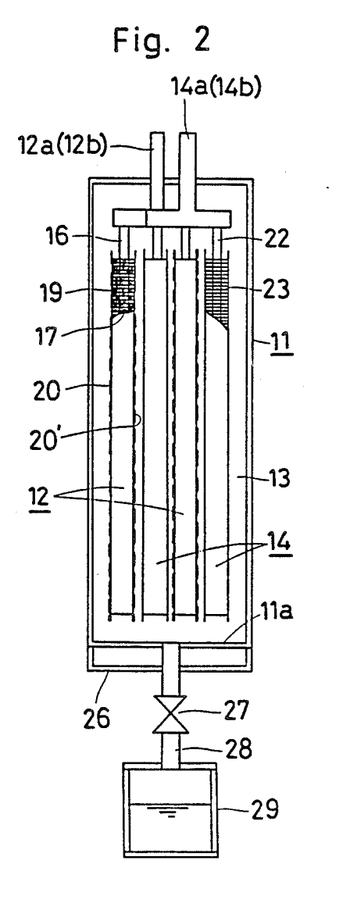
FIG. 2 is a side elevational view in cross-section of the adsorption refrigerating apparatus in FIG. 1.
Figure 3:
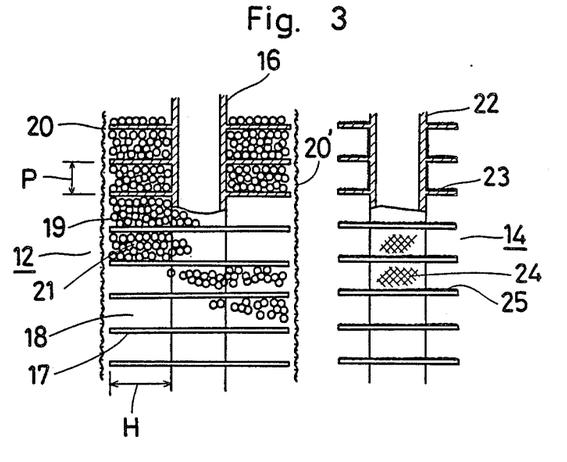
FIG. 3 is a fragmentary enlarged sectional view showing a first finned tube and a second finned tube included in the aforesaid apparatus.

Model apparatuses of almost the same construction as in FIGS. 1 to 3 were tentatively fabricated in order to conduct various comparative experiments.

(1) Comparative experiment was conducted to compare adsorption speed between the model apparatus whose first finned tube has fin dimensions (a) given in Table 1 and the model apparatus whose first finned tube has fin dimensions (b) given in Table 1.

TABLE 1

| | Fin Dimensions | | |
| --- | --- | --- | --- |
| | Diameter of Heat Transfer Tube (D) | Fin Pitch (P) | Fin Height (H) |
| a | 16 mm | 2 mm | 8 mm |
| b | 26 mm | 30 mm | 37 mm |

Here, running conditions were as follows:
Inlet Temperature of Cooling Water: 30° C.
Temperature of Low-temperature Heat Source: 70° C.
Weight of Adsorbent (Silica Gel): 29 Kg
Inlet Temperature of Cooled Water: 12° C.
Outlet Temperature of Cooled Water: 7° C.

Figure 5:
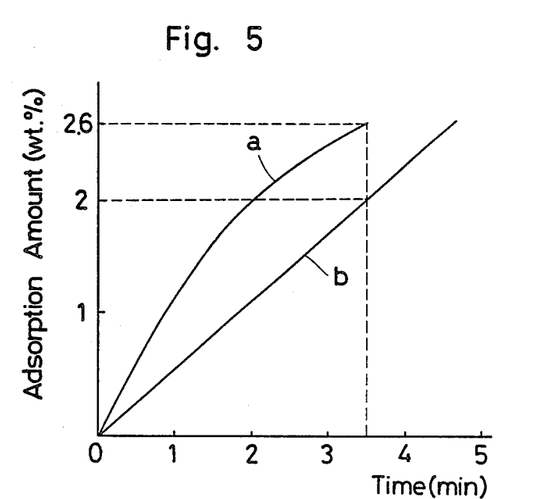
FIG. 5 is a graph showing a dependency of adsorption speed on the fin size of the first finned tube.

Results are shown in FIG. 5. The abscissa of the graph represents a lapse time and the ordinate of it a rate of weight (wt.%) of the refrigerant adsorbed to the weight of the adsorbent.

As will be apparently appreciated, the model of the fin dimensions (a) yields adsorption amounts of about 2-fold at a lapse time of 1 minute and about 1.7-fold at 2 minutes after the initiation of operation as compared with that of the fin dimensions (b), and the fin dimensions of the 1st finned tube significantly affect the adsorption speed.

The smaller the fin pitch (P) is and the greater the number of fin per unit length of the heat transfer tube 16 is, the more the heat transfer area of the fins is increased and consequently, heat transfer coefficient of them to the adsorbent 19 is in a tendency toward increase. However, when the fin pitch (P) is smaller than 1 mm, the particle diameter of the adsorbent 19 capable of being packed in the fin interstices 18 will be smaller and its packing density will be heighten, as a result of which passage of the refrigerant vapors is impeded. When the fin pitch (P) exceeds over 10 mm, the heat transfer speed between the fins 17 and the adsorbent 19 will be decreased, thus reducing adsorption speed.

Figure 6:
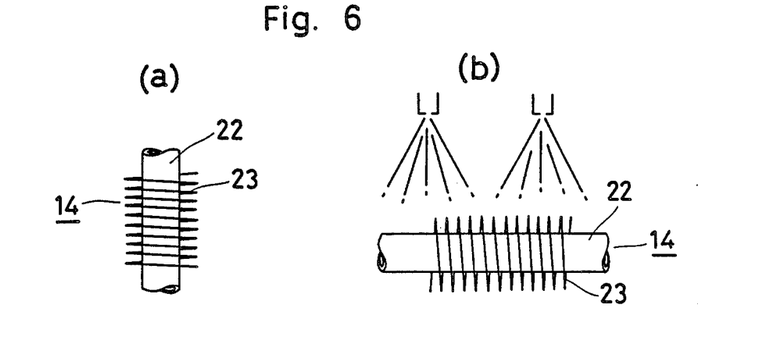
FIG. 6(a) and FIG. 6(b) are each a schematic view showing a state in which the second finned tube is arranged.

On the other hand, the higher the fin height (H), the more the packing amount of the adsorbent per unit length of the heat transfer tube 16 and it is therefore possible to make the apparatus dimension compact by lessening the number of the heat transfer tube 16. However, when the fin height (H) is in excess over 20 mm, the flowability of the refrigerant vapors through the fin interstices 18 is aggravated. Conversely, when the fin height (H) is made smaller the flowability of the refrigerant vapors tends toward improving. When the fin height (H) is less than 5 mm, the adsorption speed will reach an upper limit, but nevertheless, packing amount of the adsorbent per unit length of the heat transfer tube will be decreased, which adversely increases the number of the heat transfer tube and provides a large-sized apparatus. (2) Further, in order to investigate into variations in adsorption speed depending on different arrangement of the second finned tube 14, adsorption speed was measured with aerofin type finned tubes (fin pitch: 2 mm, fin height: 3 mm) as depicted in FIG. 6 one of which has the fins 23 arranged horizontally (a) and the other of which has the fins 23 arranged vertically (b).

The finned tube (a) was condensed and held on its surface with refrigerant vapors and the finned tube (b) was sprinkled with refrigerant liquid by means of a spray and then, both were subjected to adsorption operation, during which flow amount of a fluid flowing through the heat transfer tubes 22 and outlet and inlet temperatures of the tubes were measured to calculate adsorption amount.

Figure 7:
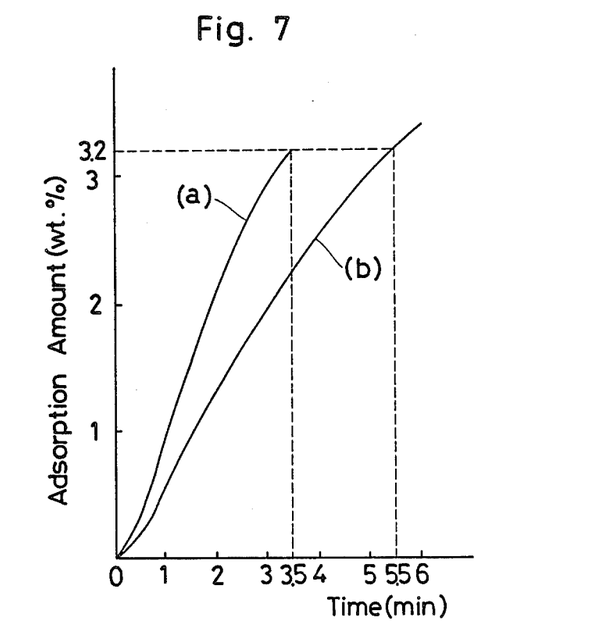
FIG. 7 is a graph showing a dependency of adsorption speed on the configuration of the second finned tube.

The results are shown in the graph of FIG. 7. The abscissa of the graph represents adsorption time and the ordinate of that weight percent of the refrigerant.

From the graph, it is seen that the case (a) where the fins 23 are horizontally arranged adsorbs 3.2% of the refrigerant at 3.5 minutes, whereas with the case (b) where the fins 23 are vertically arranged it takes 5.5 minutes to desorb the equal amount. This is considered to be due to a difference in the state of refrigerant liquid film on the surface of the finned tube 14. That is, the former (a) has a thin, uniform refrigerant liquid film formed over whole the heat transfer tube 22 and has a substantially constant vaporization speed at every portion of the film, whereas the latter (b) is formed with a refrigerant liquid film having uneven thickness owing to the action of gravity, etc. and consequently, vaporization speed at every portion is not constant, a portion of the refrigerant deposited excessively being late in vaporizing. (3) Again, comparative experiment was conducted between the model apparatus (I) wherein the refrigerant heating device 26 is installed and the model apparatus (II) wherein the refrigerant heater-condenser 26 is not installed, with the running conditions being the same as the foregoing experiment.

Results obtained are shown in Table 2 given below.

TABLE 2

| | Amount of Refrigerant Adsorbed and Desorbed within Adsorption and Desorption Time (wt. %) | Desorption Time (minute) | Adsorption Time (minute) | Cycle (min.) | Continuous Run Refrigerating Capability (Kcal/hr) |
|---|---|---|---|---|---|
| I | 2.6 | 2.5 | 3.5 | 6 | 4524 |
| II | 2.0 | 3.5 | 3.5 | 7 | 2983 |

As will be apparent from above, where during desorption, operation is conducted by heating the bottom portion of the vessel 11 from the refrigerant heating device to vaporize the refrigerant on the bottom, it was confirmed that the cycle time for adsorption and desorption is shortened by about 20%, the amount of refrigerant adsorbed and desorbed is increased by about 30% and the refrigerating capability in terms of external output is increased by about 50%, as compared with the adsorption refrigerator having no refrigerant heating means provided.

In the adsorption refrigerating apparatus of this invention thus described above, the provision of the first finned tube having a fin pitch of 1 to 10 mm and a fin height of 5 to 20 mm and the second finned tube housed in the adsorption refrigerating apparatus allows the adsorbent to be homogeneously heated and cooled quickly and brings the adsorbent and refrigerant vapors in good contact with each other, enabling the refrigerant vapors to flow through the voids among the adsorbent granules packed in the fin interstices. Because of this construction, it is possible to carry into effect refrigerating operation satisfying temperature conditions of general air-conditioning system and to terminate adsorption and desorption actions in a few minutes owing to shortening of adsorption-desorption cycle time. A large capacity of refrigeration is thus feasible with a small volume of adsorbent, with the result that a compact size and reduced cost of the refrigerating apparatus are attained.

The adsorption refrigerating apparatus of this invention is provided, at the bottom portion of the vessel, with the refrigerant heating means for heating and vaporizing a refrigerant during adsorbent desorption stage and has a refrigerant filled hermetically within the vessel in a least necessary limit amount at operating temperatures under definite running conditions. Hence, whole amount of the refrigerant desorbed from the adsorbent is held in a uniform liquid film state over the whole surface of the condenser-vaporizer finned tube, which makes the vaporization speed during desorption run homogeneous and eventually, adsorption-desorption cycle time is shortened.

Further, the disadvantage can be defeated which is seen in that the refrigerant dripped on the bottom of vessel during desorption is vaporized upon adsorption and consumed as a vain energy cooling the vessel. Therefore, the efficiency of the adsorption refrigerating apparatus is enhanced vastly.

It is noticeable that the provision of the refrigerant heating means allows to enhance the capability of whole apparatus and accordingly, capacity of the desorption refrigerator can be made smaller by that capability increment and cost of apparatus can be curtailed.

Otherwise, according to another aspect of this invention, the adsorption refrigerating apparatus is provided, at the vessel bottom portion, with the refrigerant heating-and-cooling means for heating to vaporize the refrigerant at adsorbent desorption stage and for cooling to condense the refrigerant vapors at refrigerant recovery stage and, below the vessel, with the refrigerant reservoir connected through the line and valve to the vessel, whereby the refrigerant is maintained always at an optimal amount by introducing or discharging the refrigerant from or to the reservoir by the opening or closing action of the valve depending on excess or deficiency of the refrigerant within the vessel, and the deposition of the refrigerant on the condensation-vaporization finned tube is made uniform by reason of the refrigerant vaporization action of the refrigerant heating and cooling means. Consequently, even when the vaporization temperature and the cooling water temperature are reset to be higher and lower, respectively, than the initial setting values, the capability of the apparatus is exhibited sufficiently to perform efficiently the recovery of low-temperature heat source without giving rise to the shortage in refrigerant amount. Inversely, even when the vaporization temperature and the cooling water temperature are reset to be lower and higher, respectively, surplus refrigerant is not produced, the thickness of the refrigerant liquid film deposited on the condensation-vaporization finned tube is maintained adequately as a whole by the action of the refrigerant heating-cooling means, and the efficiency of apparatus can be enhanced with no energy loss due to cooling of the vessel.

Further, in spite of such simple construction that the refrigerant reservoir is merely connected to the vessel through the valved piping, it is possible to automatically increase or decrease the refrigerant amount within the vessel only by the open-close manipulation of the valve, and any special pump is not needed to admit or discharge the refrigerant, which offers reduction of the production cost of whole system and running cost.

The efficient utilization of the refrigerant by virtue of the refrigerant heating means and optimization of the refrigerant amount by virtue of the refrigerant amount adjusting means as well as the reduction in energy loss contribute greatly to the saving of energy resources due to efficient utilization of low-temperature heat source.

The embodiments of the invention in which an exclusive property or privilege is claimed are defined as follows:

1. An adsorption refrigerating apparatus, comprising:
    a vessel substantially evacuated of air and having a refrigerant filled hermetically therein;
    a first finned tube heat exchanger housed in said vessel, through which first finned tube a first heat transfer medium on a heat source side is adapted to flow, said first finned tube having plural axially spaced fins between each of which is an interstice;
    a particulate adsorbent packed and held in the plural interstices of said first finned tube, said adsorbent forming contiguous voids among the particles thereof and adapted to allow refrigerant vapors to flow readily through said voids thereby to bring the vapors into good contact with the particles; and
    a second finned tube heat exchanger housed in said vessel, through which second finned tube a second heat transfer medium on a utilization side is adapted to flow, said second finned tube having plural axially spaced fins serving as a vaporizer and condenser;
    said first finned tube having an overall dimension smaller than an inside dimension of said vessel so as to leave a free space therebetween, said space allowing the refrigerant vapors to move freely about.

2. An adsorption refrigerating apparatus as claimed in claim 1, wherein said first finned tube has a fin pitch of 1 to 10 mm and a fin height of 5 to 20 mm, and wherein said contiguous voids among adsorbent particles in said interstices serve to route refrigerant vapors therethrough so as to bring them into good contact with the adsorbent.

3. An adsorption refrigerating apparatus as claimed in claim 1, wherein said second finned tube has a rugged surface on said fins or a heat transfer tube thereof so as to increase heat transfer area.

4. An adsorption refrigerating apparatus as claimed in claim 1, wherein said vessel is of a single body and said first and second finned tubes are contiguously arranged at a given spacing within said vessel.

5. An adsorption refrigerating apparatus as claimed in claim 1, wherein said vessel includes means defining a first container housing therein said first finned tube, and means defining a second container housing therein said second finned tube, both of said containers being in fluid communication with one another through a passageway means having a cross-section that permits the free passage of refrigerant vapors therebetween.

6. An adsorption refrigerating apparatus, comprising:
    a vessel substantially evacuated of air and having a refrigerant filled hermetically therein;
    a first finned tube heat exchanger housed in said vessel, through which first finned tube a first heat transfer medium on a heat source side is adapted to flow, said first finned tube having plural axially spaced fins between each of which is an interstice;
    a particulate adsorbent packed and held in the plural interstices of said first finned tube, said adsorbent forming contiguous voids among the particles thereof and adapted to allow refrigerant vapors to flow readily through said voids thereby to bring the vapors into good contact with the particles;
    a second finned tube heat exchanger housed in said vessel, through which second finned tube a second heat transfer medium on a utilization side is adapted to flow, said second finned tube having plural axially spaced fins serving as a vaporizer and condenser;
    said first finned tube having an overall dimension smaller than an inside dimension of said vessel so as to leave a free space therebetween, said space allowing the refrigerant vapors to move freely about; and
    refrigerant heating means for heating and vaporizing the refrigerant during a desorption stage when it is desorbed from the adsorbent, said heating means being disposed at the bottom portion of said vessel, whereby said heat transfer medium on the utilization side is cooled by the adsorption and desorption of the refrigerant to and from the adsorbent.

7. An adsorption refrigerating apparatus as claimed in claim 6, wherein said refrigerant is incorporated in said vessel in a lowest necessary amount under given running conditions such that the entire amount of the refrigerant is held in a liquid film state on the surface of said second finned tube when desorption is terminated and is adsorbed to the adsorbent when absorption is terminated.

8. An adsorption refrigerating apparatus as claimed in claim 6, wherein said refrigerant heating means is a warm water tank located adjacent to the bottom of the vessel.

9. An adsorption refrigerating apparatus as claimed in claim 6, wherein said refrigerant heating means is an electric heater located adjacent to the bottom of the vessel.

10. An adsorption refrigerating apparatus as claimed in claim 6, wherein said first finned tube has a fin pitch of 1 to 10 mm and a fin height of 5 to 20 mm, and wherein said contiguous voids among adsorbent particles in said interstices allows the refrigerant vapors to flow therethrough so as to bring them into good contact with the adsorbent.

11. An adsorption refrigerating apparatus as claimed in claim 6, wherein said first finned tube and said second finned tube are each formed as one of an aerofin type heat exchanger and a cross-fin type heat exchanger.

12. An adsorption refrigerating apparatus as claimed in claim 6, wherein said second finned tube has a rugged face on the outer periphery of its heat transfer tube or on its fins so as to increase its heat transfer area.

13. An adsorption refrigerating apparatus as claimed in claim 6, wherein said vessel is of a single body, and wherein both said first finned tube and said second finned tube are housed in said single vessel so as to be arranged contiguously to one another with a given spacing therebetween.

14. An adsorption refrigerating apparatus as claimed in claim 6, wherein said vessel has two separate containers, one of which houses said first finned tube and the other of which houses said second finned tube, said containers being connected to each other through a passageway having a cross-sectional area of such a dimension that permits free passage of refrigerant vapors therebetween.

15. An adsorption refrigerating apparatus, comprising:
a vessel substantially evacuated of air and having a refrigerant filled hermetically therein;
a first finned tube heat exchanger housed in said vessel, through which first finned tube a first heat transfer medium on a heat source side is adapted to flow, said first finned tube having plural axially spaced fins between each of which is an interstice;
a particulate adsorbent packed and held in the plural interstices of said first finned tube, said adsorbent forming contiguous voids among the particles thereof and adapted to allow refrigerant vapors to flow readily through said voids thereby to bring the vapors into good contact with the particles;
a second finned tube heat exchanger housed in said vessel, through which second finned tube a second heat transfer medium on a utilization side is adapted to flow, said second finned tube having plural axially spaced fins serving as a vaporizer and condenser;
said first finned tube having an overall dimension smaller than an inside dimension of said vessel so as to leave a free space therebetween, said space allowing the refrigerant vapors to move freely about;
refrigerant heating and cooling means for heating to vaporize the refirgerant during a desorption stage and for cooling to condense the refrigerant vapors during a refrigerant amount adjustment stage, which means is disposed at the bottom portion of the vessel, and
a refrigerant reservoir located below the bottom of the vessel and connected through a line and valve to the bottom of the vessel, said reservoir serving, in case of excessive refrigerant within the vessel, to recover therein the surplus refrigerant and, in case of deficient refrigerant within the vessel, to feed the deficiency of refrigerant to the vessel.

16. An adsorption refrigerating apparatus as claimed in claim 15, wherein said refrigerant heating and cooling means is one of a tank used for warm water and a tank used for cold water each installed adjacent to the bottom of the vessel.

17. An adsorption refrigerating apparatus as claimed in claim 15, wherein said refrigerant reservoir has a sufficient capacity to facilitate a recovery of excessive refrigerant and be internally held at a vacuum equal to that in the vessel.

18. An adsorption refrigerating apparatus as claimed in claim 15, wherein said refrigerant reservoir has a sufficient capacity to facilitate a recovery of the entire amount of refrigerant and be internally held at a vacuum equal to that in the vessel.

19. An adsorption refrigerating apparatus as claimed in claim 15, wherein said first finned tube has a fin pitch of 1 to 10 mm and a fin height of 5 to 20 mm, and wherein said contiguous voids among adsorbent particles in said interstices allows refrigerant vapors to flow therethrough so as to bring them into good contact with the adsorbent.

20. An adsorption refrigerating apparatus as claimed in claim 15, wherein said first finned tube and said second finned tube each is formed as one of a cross-fin type heat exchanger and an aerofin type heat exchanger.

21. An adsorption refrigerating apparatus as claimed in claim 15, wherein said second finned tube has a rugged face on one of its fins and outer periphery of its heat transfer tube, thereby to increase heat transfer area.

22. An adsorption refrigerating apparatus as claimed in claim 15, wherein said vessel is of a single body within which said first finned tube and said second finned tube are housed contiguous to each other with a given spacing therebetween.

23. An adsorption refrigerating apparatus as claimed in claim 15, wherein said vessel includes means defining a first container housing said first finned tube therein and means defining a second a container housing said second fined tube therein, both of said containers being mutually connected through a passageway having a cross-sectional area that permits a free passage of refrigerant vapors.

24. An adsorption refrigerating apparatus as claimed in claim 23, wherein said first and second finned tubes are one of an aerofin type heat exchanger and a cross-fin type heat exchanger.

* * * * *